April 7, 1964     A. A. TINAJERO     3,127,863
SUBMERSIBLE GROUND EFFECT MACHINE
Filed March 23, 1962     2 Sheets-Sheet 1
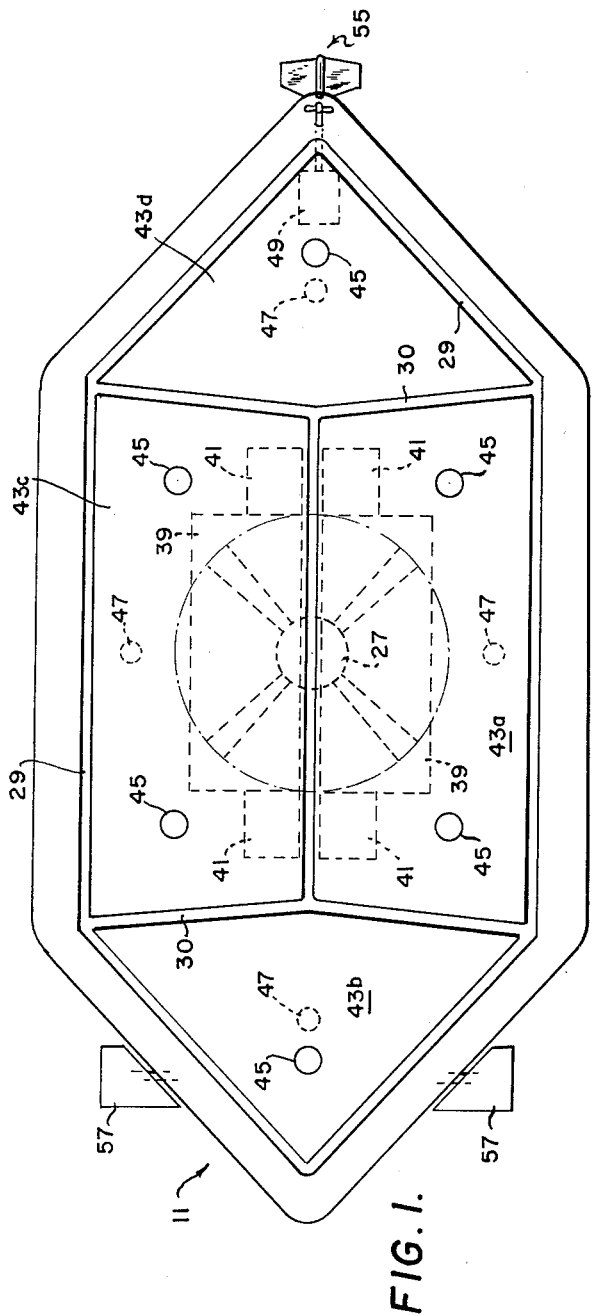
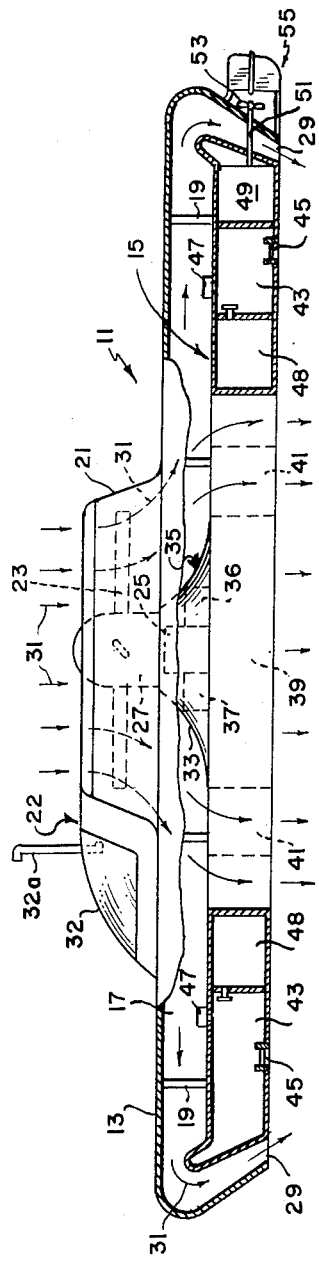
INVENTOR
ANIBAL A. TINAJERO
BY
*Albert Fryp*
AGENT.

April 7, 1964 A. A. TINAJERO 3,127,863
SUBMERSIBLE GROUND EFFECT MACHINE
Filed March 23, 1962 2 Sheets-Sheet 2

INVENTOR
ANIBAL A. TINAJERO

BY *Albert Aspy*

AGENT.

United States Patent Office 3,127,863
Patented Apr. 7, 1964

3,127,863
SUBMERSIBLE GROUND EFFECT MACHINE
Anibal A. Tinajero, 1310 N. Meade St., Arlington, Va.
Filed Mar. 23, 1962, Ser. No. 182,145
1 Claim. (Cl. 114—16)
(Granted under Title 35, U.S. Code (1952), sec. 266)

The invention described herein may be manufactured and used by or for the Government of the United States of America for governmental purposes without the payment of any royalty thereon or therefor.

This invention relates to ground effect machines and more particularly to small multiple purpose ground effect machines which may be operated over land or water, under water, and on the surface of water.

The design of a multi-purpose vehicle is difficult because the propulsion and structural requirements for airborne vehicles are essentially different from those for water vehicles. For example vehicles designed for submerged operation must be provided with a high pressure, watertight housing, while an air borne vehicle must be of light construction. Such a difference in the essential structural requirements of vehicles for multiple purposes gives rise to the problem of designing a propulsion system which will be adaptable for use with a vehicle when submerged and also for use with a vehicle when operating on the surface of water, or over the surface of land or water. Another difficulty in the design of a multipurpose vehicle is to provide one type of control means for operating the vehicle in one environment without said control means being so cumbersome that operation of the vehicle in another environment is hindered thereby.

Naturally, in the design of a small multipurpose vehicle which can be operated submerged, on the surface of water, or over the surface of land or water, compromises must be made at the expense of operating efficiency in at least some of the various environments for the purpose of providing a vehicle which may be operated in all of the environments at an acceptable level of efficiency. It is an aim of the present invention to provide a multipurpose vehicle operable in the above-mentioned several environments at an adequate level of efficiency in each environment.

In one form of the invention there is provided a vehicle primarily in the form of a ground effect machine powered by a ducted fan which drives a gas such as air at high velocity through peripheral nozzles located around the bottom of the vehicle. A small electric motor is mounted at the stern of the vehicle in a watertight casing and drives a water screw. Other elements required for use in the vehicle such as a battery, generator, the fan motor which are susceptible to deleterious affects upon exposure to water may be encased in one or a plurality of watertight housings mounted on the vehicle frame. A plurality of fluid-tight tanks each of which is provided with gas and water intake means and fluid exhaust means may be used selectively as ballasting or flotation means to control the buoyancy and, thus, the level of the vehicle when in water. The body shell and the frame of the vehicle are not watertight, and when the vehicle is submerged, there is free communication between interior spaces of the vehicle and the surrounding body of water. A watertight cockpit control station may be mounted at a suitable location on the vehicle and may be provided with the necessary controls and a periscope for observation purposes when the vehicle is submerged. Appropriate water and air control surfaces such as a rudder, an elevator and diving fins may also be mounted on the vehicle.

The frame and body or shell of the vehicle may be increasingly made of aluminum or other suitable light metals, it not being necessary for the vehicle body itself to be watertight. The watertight casings for the equipments in the vehicle are provided with suitable seals of well-known construction. It will thus be appreciated that according to the invention the framing and body of the entire vehicle may be of light, spaced construction; it being necessary only to have those elements and equipments of the vehicle which are subject to corrosion or deleterious effects from exposure to water housed in watertight compartments which may be of the lightest possible construction. Since the vehicle of the invention is intended for relatively shallow submerged operations, the watertight casings need not be constructed to withstand the much higher pressures of great depths, but need withstand the pressures of only a few feet under the surface of water.

When submerged, the vehicle may be controlled primarily by the diving fins and the rudder; when operating on the surface of water, the vehicle may be controlled primarily by the rudder and water screw, and may be controlled to an extent by the fan and peripheral nozzles normally used for ground effects, but here used to control the attitude and position of the vehicle on the surface of water. Of course, when the vehicle has risen to a level in the water such that the fan extends above the level of the water, the fan drive motor may be energized to drive the fan to thereby increase the speed at which the vehicle may be raised to a higher level in the water, and eventually, out of the water. When the vehicle is operating over the surface of water or land, the controls are exercised primarily through the peripheral nozzles and may be aided by some of the said other controls.

It is, therefore, an object of this present invention to provide a small multi-purpose vehicle which may be operated submerged, on the surface of water and over the surface of land or water.

It is a further object of the present invention to provide a multi-purpose vehicle which may utilize ground effects propulsion means in cooperation with conventional means to propel and direct the vehicle through water, and to control and enhance the speed of ascent and descent of said vehicle by said ground effects propulsion means.

Another object of this invention is the provision of encasing only those elements of a vehicle subject to corrosive effects of water in watertight compartments which are relatively small and light relative to the overall size of the vehicle, thereby reducing the weight of the vehicle so that it may be operated not only in water, but also over the surface of land or water in an efficient manner.

A feature of the present invention is the provision in a vehicle of an arrangement of interacting propulsion and control elements encased in separate and light water-tight housings, the vehicle being of light frame construction with interior spaces wherein when the vehicle is submerged, water may enter the interior spaces thereof in free communication with a body of water.

These and other objects and features of the invention will be better understood by referring to the accompanying drawings in which;

FIG. 1 is a modified cross-sectional view of the small multi-purpose ground effect machine according to the invention;

FIG. 2 is a bottom view of the machine according to the invention; and

Figure 3:
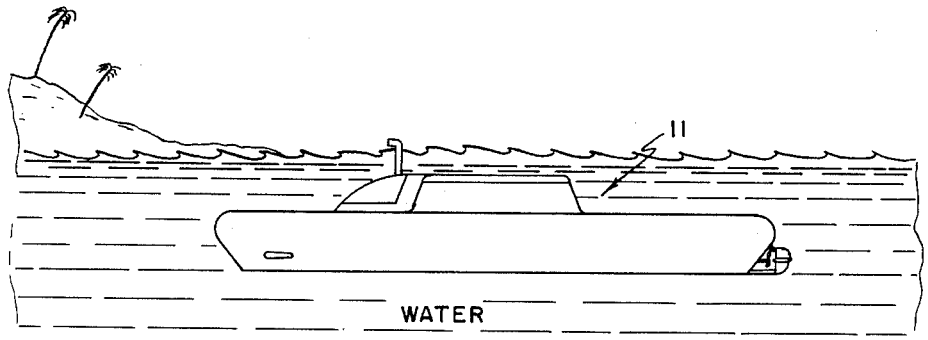

FIGS. 3, 4, 5, and 6 are views of the position of the vehicle according to the invention respectfully over water, on the surface of water, over the surface of land, and submerged.

Referring to the drawings in which the same reference numerals are used to indicate like or corresponding parts, and more particularly to FIG. 1, the numeral 11 indicates a small multi-purpose vehicle primarily in the form of a ground effect machine. The vehicle 11 includes a hollow body or shell 13 of any suitable shape surrounding an inner body in the general form of a box shaped sheet-covered inner frame 15 in spaced relationship therefrom to form an interior space 17. The body 13 and the inner frame 15 are preferably constructed of light materials such as aluminum or alloys thereof including steel or other suitable materials, or of suitable synthetic compounds. The body 13 and the frame 15 are mutually supported by a plurality of spaced supports 19 which serve to rigidly locate the body 13 and the frame 15 in mutual spaced relationship. The frame 15 may be of a reinforced sheet construction, or, as is shown in FIG. 2, may be a flat box covered by a thin sheet of light material and of sufficient stiffness to be essentially rigid when supported by the supports 19. The body 13 may be a thin sheet of similar material supported to be essentially rigid by the supports 19.

A protruding circular wall 21 is formed by the body 13 and extends upwardly therefrom to provide an opening or duct 22 for a fan 23. The fan 23 is rotatably mounted on a shaft (not shown) which extends upwardly to the fan 23 from a suitably powered drive motor 25 therefor of conventional construction supportedly mounted on the frame 15 in a watertight housing 27. Suitable bearing seals of conventional construction may be provided between the fan 23 and the watertight motor housing 27, or between the fan shaft and the watertight housing 27, to prevent the entry of water into the watertight housing 23.

The sides of the body 13 curve downwardly and inwardly to an opening in the bottom of the body 13, said opening being partially blocked by the frame 15 so that the interior space 17 becomes narrowed near the bottom of vehicle 11 to form a peripheral nozzle 29 conforming to the shape of the vehicle 11 at its bottom which may be of oval, hexagonal or any suitable shape. Additional nozzles for stability purposes may be provided by constructing the frame 15 with partitions forming slots or openings indicated at 30 therein crossing the bottom thereof.

The arrows 31 shown in FIG. 2 indicate the direction of the flow of air drawn from the surrounding atmosphere inwardly by the fan 23 into the interior space 17 and outwardly at high velocity through the peripheral nozzles 29. The air driven outwardly through the peripheral nozzles 29 acts in a well-known manner to maintain the position of the vehicle 11 above the surface of water or land due to the phenomenon of ground effects beneath the vehicle 11.

A watertight cockpit 32 is mounted on the body 13 forwardly of the ducted fan and may include the necessary controls for actuating the various equipments such as motors, control surfaces, etc., located in the vehicle 11. A periscope 32a is conventionally mounted in the cockpit 32 for observation purposes when the vehicle 11 is submerged.

Near the base of the watertight fan motor housing 27 are flared members 33 which are integral with, or suitably sealed to, the housing 27 and to the frame 15 to form an outer watertight housing 35. Encased by the outer watertight housing 35 is an electrical generator 36 and an air compressor 37 which may be driven by the drive motor 25.

Fuel tanks 39 for the drive motor 25 are rigidly mounted on the frame 15 below the drive motor 25, preferably symmetrically about the center of gravity of the vehicle 11. Watertight battery compartments 41 are rigidly mounted in the frame 15 externally of the fuel tanks 39. Conductors may be watertightly passed from the drive motor 25 through the housing 35 for charging the generator 36, and from the generator 36 to the batteries in the compartments 41.

In order to control the buoyancy, and, therefore, the level of the vehicle 11 when in water, watertight tanks 43 are rigidly mounted in the frame 15. Four tanks 43a, 43b, 43c, and 43d are shown for purposes of illustration, but the number and disposition of the tanks 43 may be varied in accordance with particular design requirements.

Each of the tanks 43 is provided with a suitably controlled water inlet and exhaust valve 45 located in the bottom of each tank, and at the top of each tank is a controllable vent 47. A compressed air compartment or bottle 48 having a suitable connection (not shown) to the air compressor 37 in the housing 35 is located in a portion of each of the tanks 43 for the purpose of providing high pressure air to each of the tanks 43 in order to force water therefrom through the valve 45, thereby increasing the buoyancy of the vehicle 11. In order to decrease the buoyancy of the vehicle 11, the water intake valves 45 are opened, and air may escape through the controlled opening of vents 47.

An electric motor 49 is shown mounted in a watertight compartment at the stern of the vehicle 11 in the tank 43d, and the motor 49 may be suitably connected for control from the cockpit 32. The electric motor 49 drives a shaft 51 for rotating a water screw 53 for the purposes of propelling the vehicle 11 when on or beneath the surface of water. A suitably controlled rudder and elevator assembly 55 of conventional construction is mounted on the body 13 abaft the water screw 51 for controlling the direction of the vehicle 11 when underway in water. A pair of diving fins 57, controllable through conventional linkage as by wires of electro-hydraulic means from the cockpit 32, aid to position the vehicle 11 when submerged.

The operation of the invention will now be explained in conjunction with FIGS. 3–6 which illustrate the vehicle 11 in various positions with relation to the surface of water or land. In FIGS. 4 and 6 the vehicle 11 according to the invention is shown in a ground effect position. For producing ground effects, the fan 23 is rotated at high speed to force air into the opening or duct 22 formed by the protruding walls 21, the air being forced through the interior space 17 of the vehicle and the peripheral nozzles 29 at high velocity, thereby producing a region beneath the vehicle 11 of higher air pressure than that of the surrounding atmosphere. The direction of travel of the vehicle 11 when in use as a ground effect machine may be controlled by the disposition of weight thereon, by additional volumes of air forced through only a part of the nozzle, by vanes mounted in the nozzles 29, or by any other suitable means. As a ground effect machine, the vehicle 11 has maximum mobility and speed over land or water.

Figure 5:
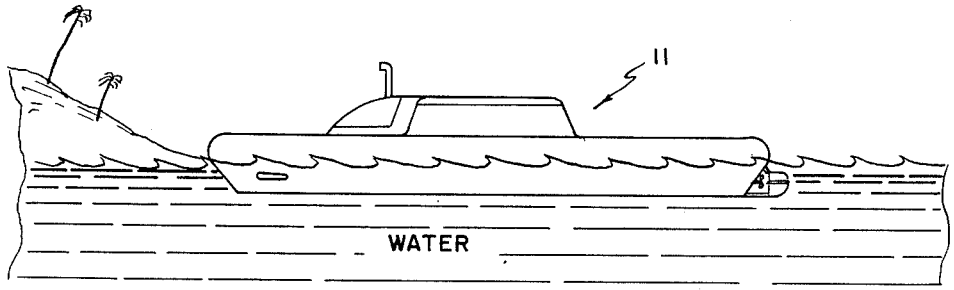
Figure 6:
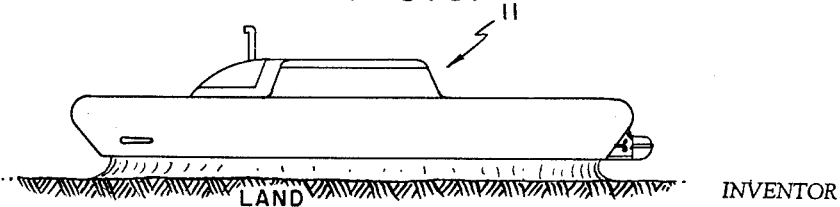

Referring to FIG. 5, the vehicle 11 is shown in its position when being used as a surface vessel. The vehicle 11 is caused to come to rest on the surface of the water from a ground effect position by reducing the speed of rotation of the fan 23 until the vehicle 11 is in a suitable position and level on the surface of the water, and once the vehicle 11 is on the surface of the water, the fan 27 may be stopped or operated at considerably reduced speed thereby forcing a small amount of air through the interior space 17. Because a certain amount of air under slight pressure is being forced toward the peripheral nozzles 29, the level of the vehicle 11 on the surface of the water may be controlled by the amount of air pressure in the interior space 17 in various states of equilibrium with the water which floods a portion of the interior space 17.

As soon as the water screw 53 is sufficiently beneath the water, the electric drive motor 49 therefor may be energized to drive the water screw 53 to propel the vehicle 11 through the water at a desired speed and controlled in its course and attitude by the elevator and assembly rudder 55 in a well-known manner. In addition, the diving fins 57 may be adjusted from the control station at the cockpit 32 to control the pitch of the vehicle 11.

Figure 4:
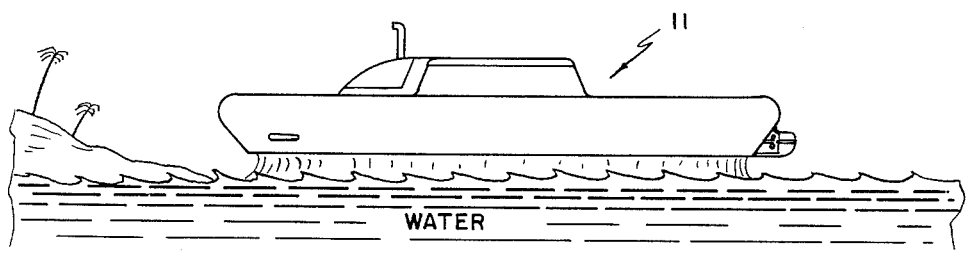

Referring to FIG. 3 in which the vehicle 11 is shown in use as a submarine, the vehicle 11 is caused to become submerged by opening the water intake valves 45 located in the bottom of the tanks 43. At the same time the valves 45 are opened, the air may escape through the vent valves 47. The vent valves 47 may be adapted to permit the escape of air into the interior space 17 when the air pressure in the tanks 43 exceeds a certain amount. Alternatively, the escape or vent valves 47 may be controlled from the cockpit 32 by suitable means such as solenoids, wires or hydraulic control means. Of course, at about the same time the valves 45 are opened, any valves of the compressed air compartments or bottles 48 will be closed to prevent waste of compressed air.

The filling of the tanks 43 with water produces a ballasted condition whereby the effective buoyancy of the vehicle 11 is reduced to a level sufficient to permit the vehicle 11 to sink into the water and to become submerged. During the submerging of the vehicle, 11, the screw 53 may be propelling the vehicle, and the vehicle may be controlled by both the diving fins 57 and the elevator rudder assembly 55. It is understood that as the vehicle 11 submerges, water will also enter the interior space 17, and, the fan 23 having been stopped, the level of water in the interior space 17 will rise until the interior space 17 is eventually filled with water. Since according to the invention all of the equipment compartments in the vehicle, such as the compartments 27, 32, 35, 39, and 49 are watertight, none of the water in the interior space 17 will have any deleterious effect on the equipment.

It is also to be understood that the depth to which the vehicle 11 is submerged may be controlled through any suitable control means by regulating the amount of water allowed to flood the tanks 43. The diving fins 57 and the fan 23 may also be used to vary the speed of ascent or descent of the vehicle 11 in water.

In order to change the position of the vehicle 11 from a submerged position such as shown in FIG. 3 to the surface position as shown in FIG. 5, the vent valves 47 are closed, and through suitable control means air is permitted to escape from the compressed air compartments or bottles 48 into the tanks 43, thereby expelling any water in the tanks through the valves 45. Water escapes from the valves 45 thereby increasing the effective buoyancy of the vehicle 11. The speed of ascent of the vehicle 11 in the water may be enhanced by controlling the angle of the diving fins 57 so as to cause the bow end of the vehicle 11 to be raised, and also by rotating the fan 23 while immersed.

As soon as the vehicle 11 has risen in the water sufficiently so that the fan 23 is above the surface of the water in the interior space 17, the speed of the fan 23 may be increased causing air to be drawn into the opening or duct 22 to thereby further increase the speed at which the vehicle 11 will ascend. Of course, the speed of descent may be enhanced by reversing the direction of the fan 23 so that the vehicle 11 descends into the water much quicker than descent due to ballasting alone.

In order to raise the vehicle 11 from its position on the surface of the water as shown in FIG. 5 to a position above the surface of the water as shown in FIG. 4, the fan 23 is rotated at high speed, thereby causing an increased amount of air to be forced through the opening or duct 22 into the interior space 17 and through the peripheral nozzles 29 and stability nozzles 30. In order to facilitate the raising of the vehicle, the vehicle may also at this time be propelled through the water by the screw 53, and the diving fins 57 may be oriented so as to tend to lift the bow end of the vehicle 11 higher in the surface of the water. However, the fan 23 of itself should have enough power to lift the vehicle 11 out of the water.

Referring to FIG. 6, the vehicle 11 is shown in its position above the surface of land due to ground effects caused by the discharge of air at high pressure from the nozzles 29 and 30. The physical forces acting when the vehicle 11 is above ground are essentially the same as those when over water.

Of course, the utility of the vehicle 11 according to the invention is not limited to military operations, but on the contrary may be utilized for a great number of operations such as air/sea rescue, fishing, skin-diving or as a personal vehicle. Other uses of the vehicle 11 according to the invention may include operation in which the vehicle 11 may be used as an ancillary vehicle with other military and commercial vessels, and more generally as an all-purpose transportation vehicle especially in those situations wherein a multi-purpose vehicle according to the invention provides greatly increased economy due to the fact that it is adaptable for several environmental operating conditions.

It is to be understood that instead of using a ducted fan any other suitable means may be used to provide air at high pressure beneath the vehicle 11. Moreover, the ducted fan as illustrated in the drawings need not be located at the top of the vehicle 11, but may be located in other positions on the vehicle 11 to produce thrust through the nozzle.

Obviously many modifications and variations of the present invention are possible in the light of the above teachings. It is therefore to be understood that within the scope of the appended claim the invention may be practiced otherwise than as specifically described.

What is claimed is:

A vehicle operable by ground effect over water and operable in surfaced or submerged positions, said vehicle comprising:

outer and inner juxtaposed essentially flat elongated hollow bodies of low profile separated from each other by rigid supports, there being formed between said bodies an internal duct having an upper opening and a bottom peripheral nozzle, said duct therefore being freely floodable when the vehicle is in water;

means comprising a fan mounted in said vehicle for directing water upwardly and downwardly in said duct to at least enhance the speed of descent or ascent respectively of said vehicle when said fan is immersed in water;

said fan when free of water directing air upwardly or downwardly in said duct to enhance the speed of descent or ascent respectively;

said fan when free of water directing high velocity air through said nozzle to produce ground effects;

ballast means located in said vehicle for varying the buoyancy of the vehicle; and propulsion means for propelling said vehicle through water.

References Cited in the file of this patent

UNITED STATES PATENTS

| | | |
|---|---|---|
| 896,361 | Cage | Aug. 18, 1908 |
| 1,579,109 | Haseley | Mar. 30, 1926 |
| 2,918,889 | Rebikoff | Dec. 29, 1959 |
| 2,969,032 | Pinnes | Jan. 24, 1961 |
| 3,040,688 | Gram | June 26, 1962 |

FOREIGN PATENTS

| | | |
|---|---|---|
| 219,133 | Australia | Jan. 8, 1959 |
| 1,258,780 | France | Mar. 6, 1961 |
| 551,361 | Italy | Nov. 19, 1956 |

OTHER REFERENCES

"Sciene and Mechanics," issue of June 1960, pages 73–77.

"SAE Journal," issue of March 1960, page 27.